US010341174B2

(12) United States Patent
He et al.

(10) Patent No.: US 10,341,174 B2
(45) Date of Patent: Jul. 2, 2019

(54) NETWORK PERCEPTION BASED SERVICE POLICY CONFIGURATION METHOD AND NETWORK DEVICE

(71) Applicant: CHINA ACADEMY OF TELECOMMUNICATIONS TECHNOLOGY, Beijing (CN)

(72) Inventors: Yuan He, Beijing (CN); Fei Qin, Beijing (CN); Jiamin Liu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 23 days.

(21) Appl. No.: 15/534,473

(22) PCT Filed: Sep. 21, 2015

(86) PCT No.: PCT/CN2015/090194
§ 371 (c)(1),
(2) Date: Jun. 8, 2017

(87) PCT Pub. No.: WO2016/090987
PCT Pub. Date: Jun. 16, 2016

(65) Prior Publication Data
US 2017/0339012 A1 Nov. 23, 2017

(30) Foreign Application Priority Data
Dec. 10, 2014 (CN) .......................... 2014 1 0757874

(51) Int. Cl.
*H04L 12/26* (2006.01)
*H04L 12/24* (2006.01)
(Continued)

(52) U.S. Cl.
CPC ......... *H04L 41/0803* (2013.01); *H04W 24/00* (2013.01); *H04W 24/08* (2013.01)

(58) Field of Classification Search
CPC .... H04L 41/0803; H04W 24/00; H04W 24/08
See application file for complete search history.

(56) References Cited

U.S. PATENT DOCUMENTS

2005/0254429 A1* 11/2005 Kato ................... H04L 41/0806
370/238
2010/0238899 A1 9/2010 Mansour et al.
2011/0294527 A1* 12/2011 Brueck ................. H04W 24/02
455/466

FOREIGN PATENT DOCUMENTS

CN  101282569 A  10/2008
CN  101658058 A  2/2010
(Continued)

OTHER PUBLICATIONS

State IP Office of P.R. China; International Search Report for counterpart International Application No. PCT/CN2015/090194 containing International Search Report in English, 5 pgs. (dated Dec. 15, 2015).
(Continued)

*Primary Examiner* — Chi H Pham
*Assistant Examiner* — Fahmida S Chowdhury
(74) *Attorney, Agent, or Firm* — Womble Bond Dickinson (US) LLP

(57) ABSTRACT

Disclosed are a network perception based service policy configuration method and network device, the method comprising: acquiring network perceived information of a first node; establishing an environment information map of the first node according to the network perceived information; acquiring characteristic information of the first node; configuring a service policy for the first node according to the characteristic information of the first node and the environment information map, thus configuring the service policy (Continued)

for the network node according to the network perceived information and the node characteristics.

27 Claims, 5 Drawing Sheets

(51) Int. Cl.
    *H04W 24/00*     (2009.01)
    *H04W 24/08*     (2009.01)

(56)     References Cited

FOREIGN PATENT DOCUMENTS

| | | |
|---|---|---|
| CN | 101990197 A | 3/2011 |
| CN | 102355680 A | 2/2012 |
| CN | 102595416 A | 7/2012 |
| EP | 2418889 A1 | 2/2012 |
| EP | 2418889 A1 | 2/2012 |
| WO | WO 2014144079 A2 | 9/2014 |

OTHER PUBLICATIONS

State IP Office of P.R. China; Written Opinion for counterpart International Application No. PCT/CN2015/090194, 4 pgs. (dated Dec. 15, 2015).

European Patent Office, Extended European Search Report for European Patent Application No. 15887553.8, dated Oct. 13, 2017, 10 pages.

Chinese Office Action dated Jul. 3, 2018 in CN101658058A.

\* cited by examiner

NETWORK PERCEPTION BASED SERVICE POLICY CONFIGURATION METHOD AND NETWORK DEVICE

CROSS-REFERENCE TO RELATED APPLICATIONS

This application is a National Stage of International Application No. PCT/CN2015/090194, filed Sep. 21, 2015, which claims the benefit of Chinese Patent Application No 01410757874.1, filed with the Chinese Patent Office on Dec. 10, 2014 which was incorporated by reference in its entirety.

FIELD

The present invention relates to the field of communications, and particularly to a method and network device for configuring a service policy through network perception.

BACKGROUND

There is such a central controller, i.e., a Radio Resource Management Equipment (RRME), in an existing multi-Radio Access Technology (RAT) network that generally provides switching, admission control, load balancing, interference coordination, and other multi-RAT resource management and coordination functions, and a radio resource management device and a base station can exchange corresponding radio resource management information with each other. FIG. 1 illustrates the architecture of centralized networking, where the radio resource management device can be an Operation, Administration and Maintenance (OAM) node. The base station operates at a frequency and in a bandwidth, both of which are configured by the OAM node in whichever of centralized or distributed networking.

In future development of a mobile communication, in order to better satisfy the demand of a user, the capability and throughput of the network need to be improved greatly, thus inevitably resulting in more access nodes with low power and small coverage areas to be introduced thereto, so the network will become an ultra-dense network in the future. Since there are a large number of nodes densely populated in the ultra-dense network, it will inevitably suffer from the problems of serious inter-cell interference, and degraded performance of the system. A relationship between adjacent cells in the ultra-dense network is configured by the OAM node, where there are such a large number of cells that the base station may be discouraged from maintaining the relationship between the adjacent cells. Also the base station may be enabled or disabled, or some node may be plugged and played, some cell may be accessed or exited, etc., so that the base station in the network may be varying, thus resulting in flexible and variable networking in the future. Accordingly the traditional configuration mode using the OAM node may not be adapted to the varying network.

In view of this, it is highly desirable to provide a method for configuring a service policy flexibly according to a network condition.

SUMMARY

Embodiments of the invention provide a method and network device for configuring a service policy through network perception so as to configure a network node with a service policy according to network perceived information and a node characteristic.

In order to attain the object above, an embodiment of the invention provides a method for configuring a service policy through network perception, the method including:
obtaining network perceived information of a first node;
creating an environmental information map of the first node according to the network perceived information;
obtaining characteristic information of the first node; and
configuring the first node with a service policy according to the environmental information map, and the characteristic information of the first node.

Preferably the network perceived information includes:
measurement information measured by the first node, and/or information obtained by the first node from broadcast messages of adjacent nodes.

Preferably the measured measurement information includes one or any combination of the following information:
a signal strength, a signal quality, an operating frequency, an operating bandwidth, a radio frequency capability, geographical positional coordinates, and a cell identifier; and
the information from the broadcast message of an adjacent node includes one or any combination of the following information:
transmission power, a radio frequency capability, geographical positional coordinates, a cell identifier, Time Division Duplex (TDD) configuration information, and Multimedia Broadcast Multicast Service Single Frequency Network (MBSFN) configuration information.

Preferably the method further includes:
obtaining characteristic information of adjacent nodes of the first node; and
the configuring the first node with the service policy includes:
configuring the first node with the service policy according to the environmental information map, and the characteristic information of the first node, and the adjacent nodes of the first node.

Preferably all the step of obtaining the network perceived information of the first node, the step of creating the environmental information map of the first node according to the network perceived information, the step of obtaining the characteristic information of the first node, and the adjacent nodes of the first node, and the step of configuring the first node with the service policy are performed by a central node; and
a management domain of the central node includes the first node.

Preferably the obtaining the network perceived information of the first node includes:
receiving, by the central node, a measurement report message reported by the first node, wherein the measurement report message includes a part or all of measurement information of the first node for the adjacent nodes; and/or
receiving, by the central node, information reported by the first node, wherein the reported information includes information obtained by the first node from broadcast messages sent by the adjacent nodes.

Preferably the obtaining the characteristic information of the first node, and the adjacent nodes of the first node includes:
receiving, by the central node, the characteristic information respectively reported by the first node, and the adjacent nodes of the first node.

Preferably the obtaining the characteristic information of the adjacent nodes of the first node includes:
if the adjacent nodes of the first node include a second node, wherein the second node is not in the management domain of the central node, and there is a backhaul link between the second node and the central node, then interacting, by the central node, with the second node over the backhaul link between the central node and the second node to obtain the characteristic information of the second node.

Preferably the first node is in the management domain of the central node; and the obtaining the characteristic information of the adjacent nodes of the first node includes:

if the adjacent nodes of the first node include a second node, wherein the second node is not in the management domain of the central node, and there is a backhaul link between the first node and the second node, then:

instructing, by the central node, the first node to report the characteristic information of the second node, so that the first node interacts with the second node over the backhaul link between the first node and the second node in response to the instruction to obtain the characteristic information of the second node, and sends the obtained characteristic information to the central node; or sending, by the first node, the characteristic information sent by the second node, to the central node.

Preferably all the step of obtaining the network perceived information, the step of creating the environmental information map according to the network perceived information, the step of obtaining the characteristic information of the first node, and the adjacent nodes of the first node, and the step of configuring the first node with the service policy are performed by the first node.

Preferably the obtaining the network perceived information of the first node includes:

measuring, by the first node, the adjacent nodes, and obtaining the network perceived information of the first node according to measurement information; and/or receiving, by the first node, broadcast messages sent by the adjacent nodes, and obtaining the network perceived information of the first node according to the received broadcast messages.

Preferably the obtaining the characteristic information of the adjacent nodes of the first node includes:

interacting, by the first node, with the adjacent nodes of the first node over backhaul links between the first node and the adjacent nodes to obtain the characteristic information of the adjacent nodes of the first node.

Preferably there is a backhaul link between the first node and the central node, and the first node is not in a management domain of the central node; and the obtaining the characteristic information of the adjacent nodes of the first node includes:

if the adjacent nodes of the first node include a second node, wherein the second node is a node in the management domain of the central node, and there is no backhaul link between the first node and the second node, then interacting, by the first node, with the central node over the backhaul link between the first node and the central node to obtain the characteristic information of the second node.

Preferably the first node is not in a management domain of the central node; and the obtaining the characteristic information of the adjacent nodes of the first node includes:

if the adjacent nodes of the first node include a second node, wherein the second node is in the management domain of the central node, and there is a backhaul link between the first node and the second node, then:

interacting, by the first node, with the second node over the backhaul link between the first node and the second node to request for the characteristic information of the second node, wherein the second node retrieves the characteristic information of the second node from the central node over the backhaul between the second node and the central node, and sends it to the first node; or interacting, by the first node, with the second node over the backhaul between the first node and the second node to obtain the characteristic information of the second node.

Preferably the environmental information map of the first node represents one or any combination of the following information:

relative positions between the first node and adjacent nodes of the first node;

a neighbor relation of the first node; and spectrum use conditions of the adjacent nodes of the first node.

Preferably the creating the environmental information map of the first node according to the network perceived information includes one of:

determining relative positions between the first node and adjacent nodes of the first node according to the network perceived information, and creating the environmental information map of the first node;

determining a neighbor relation of the first node according to the network perceived information, and creating the environmental information map of the first node;

determining spectrum use conditions of adjacent nodes of the first node according to the network perceived information, and creating the environmental information map of the first node;

determining relative positions between the first node and adjacent nodes of the first node according to the network perceived information, determining a neighbor relation of the first node according to the relative positions, and creating the environmental information map of the first node according to the relative positions, and the neighbor relation of the first node;

determining relative positions between the first node and the adjacent nodes of the first node, and spectrum use conditions of the adjacent nodes of the first node according to the network perceived information, and creating the environmental information map of the first node;

determining a neighbor relation of the first node according to the network perceived information, determining spectrum use conditions of adjacent nodes of the first node according to the neighbor relation of the first node, and creating the environmental information map of the first node according to the neighbor relation of the first node, and the spectrum use conditions of the adjacent nodes of the first node; and determining relative positions between the first node and adjacent nodes of the first node determined according to the network perceived information, determining a neighbor relation of the first node according to the relative positions, determining spectrum use conditions of the adjacent nodes of the first node according to the neighbor relation of the first node, and creating the environmental information map of the first node according to the relative positions, the neighbor relation, and the spectrum use conditions.

Preferably the method further includes:

updating the environmental information map of the first node upon reception of an indicator that an adjacent node of the first node accesses or exits, or upon detecting a movement of adjacent node of the first node.

Preferably the characteristic information includes one or any combination of the following information:

capability information, supported frequencies, a supported bandwidth, the type of a backhaul link, and the characteristic of the backhaul link.

An embodiment of the invention further provides a network device including:

a first obtaining module configured to obtain network perceived information of a first node;

a first processing module configured to create an environmental information map of the first node according to the network perceived information;

a second obtaining module configured to obtain characteristic information of the first node; and a second processing module configured to configure the first node with a service policy according to the environmental information map, and the characteristic information of the first node.

Preferably the network perceived information includes:

measurement information measured by the first node, and/or information obtained by the first node from broadcast messages of adjacent nodes.

Preferably the measured measurement information includes one or any combination of the following information:

a signal strength, a signal quality, an operating frequency, an operating bandwidth, a radio frequency capability, geographical positional coordinates, and a cell identifier; and the information obtained from the broadcast message of an adjacent node includes one or any combination of the following information:

transmission power, a radio frequency capability, geographical positional coordinates, a cell identifier, Time Division Duplex (TDD) configuration information, and Multimedia Broadcast Multicast Service Single Frequency Network (MBSFN) configuration information.

Preferably the second obtaining module is further configured to obtain characteristic information of adjacent nodes of the first node; and the second processing module is configured to configure the first node with the service policy according to the environmental information map, and the characteristic information of the first node, and the adjacent nodes of the first node.

Preferably the network device is a central node; and a management domain of the central node includes the first node.

Preferably the first obtaining module is configured:

to receive a measurement report message reported by the first node, wherein the measurement report message includes a part or all of measurement information of the first node for the adjacent nodes; and/or to receive information reported by the first node, wherein the reported information includes information obtained by the first node from broadcast messages sent by the adjacent nodes.

Preferably the second obtaining module is configured:

to receive the characteristic information respectively reported by the first node, and the adjacent nodes of the first node.

Preferably the second obtaining module is configured:

if the adjacent nodes of the first node include a second node, wherein the second node is not in the management domain of the central node, and there is a backhaul link between the second node and the central node, to interact with the second node over the backhaul link between the central node and the second node to obtain the characteristic information of the second node.

Preferably the first node is in the management domain of the central node; and the second obtaining module is configured:

if the adjacent nodes of the first node include a second node, wherein the second node is not in the management domain of the central node, and there is a backhaul link between the first node and the second node, to instruct the first node to report the characteristic information of the second node, so that the first node interacts with the second node over the backhaul link between the first node and the second node in response to the instruction to obtain the characteristic information of the second node, and sends the obtained characteristic information to the central node; or to receive the characteristic information of the second node sent by the first node.

Preferably the network device is the first node.

Preferably the first obtaining module is configured:

to measure the adjacent nodes, and to obtain the network perceived information of the first node according to measurement information; and/or to receive broadcast messages sent by the adjacent nodes, and to obtain the network perceived information of the first node according to the received broadcast messages.

Preferably the second obtaining module is configured:

to interact with the adjacent nodes of the first node over backhaul links between the first node and the adjacent nodes to obtain the characteristic information of the adjacent nodes of the first node.

Preferably there is a backhaul link between the first node and the central node, and the first node is not in a management domain of a central node; and the second obtaining module is configured:

if the adjacent nodes of the first node include a second node, wherein the second node is a node in the management domain of the central node, and there is no backhaul link between the first node and the second node, to interact with the central node over the backhaul link between the first node and the central node to obtain the characteristic information of the second node.

Preferably the first node is not in a management domain of the central node; and the second obtaining module is configured:

if the adjacent nodes of the first node include a second node, wherein the second node is in the management domain of the central node, and there is a backhaul link between the first node and the second node, to interact with the second node over the backhaul link between the first node and the second node to request for the characteristic information of the second node, and to receive the characteristic information of the second node, wherein the second node retrieves the characteristic information of the second node from the central node over the backhaul between the second node and the central node, and sends it to the first node; or to interact with the second node over the backhaul between the first node and the second node to obtain the characteristic information of the second node.

Preferably the environmental information map of the first node represents one or any combination of the following information:

relative positions between the first node and adjacent nodes of the first node;

a neighbor relation of the first node; and spectrum use conditions of the adjacent nodes of the first node.

Preferably the first processing module is further configured:

when the first obtaining module receives an indicator that an adjacent node of the first node accesses or exits, or detects a movement of adjacent node of the first node to update the environmental information map of the first node.

Preferably the characteristic information includes one or any combination of the following information:

capability information, supported frequencies, a supported bandwidth, the type of a backhaul link, and the characteristic of the backhaul link.

An embodiment of the invention provides another network device which can perform the method according to the embodiments above of the invention. The device can include a processor configured to read programs in a memory, and to perform processes of:

obtaining network perceived information of a first node through a transceiver, creating an environmental information map of the first node according to the network perceived information obtained by the transceiver, obtaining characteristic information of the first node through the transceiver, and configuring the first node with a service policy according to the environmental information map, and the characteristic information of the first node;

the memory configured to store one or more executable programs for configuring the processor; and the transceiver configured to be controlled by the processor to transmit and receive data.

Optionally the processor is further configured to read the programs in the memory, and to perform a process of:
obtaining characteristic information of adjacent nodes of the first node through the transceiver; and when configuring the first node with the service policy, the processor is configured to read the programs in the memory, and to perform a process of: configuring the first node with the service policy according to the environmental information map, and the characteristic information of the first node, and the adjacent nodes of the first node.

Optionally the network device is a central node; and a management domain of the central node includes the first node.

Optionally the processor is configured to read the programs in the memory, and to perform processes of:

receiving a measurement report message reported by the first node through the transceiver, wherein the measurement report message includes a part or all of measurement information of the first node for the adjacent nodes; and/or receiving information reported by the first node through the transceiver, wherein the reported information includes information obtained by the first node from broadcast messages sent by the adjacent nodes.

Optionally the processor is configured to read the programs in the memory, and to perform a process of:

receiving the characteristic information respectively reported by the first node, and the adjacent nodes of the first node through the transceiver.

Optionally the processor is configured to read the programs in the memory, and to perform a process of:

if the adjacent nodes of the first node include a second node, wherein the second node is not in the management domain of the central node, and there is a backhaul link between the second node and the central node, then interacting with the second node over the backhaul link between the central node and the second node through the transceiver to obtain the characteristic information of the second node.

Optionally the first node is in the management domain of the central node; and the processor is configured to read the programs in the memory, and to perform a process of:

if the adjacent nodes of the first node include a second node, wherein the second node is not in the management domain of the central node, and there is a backhaul link between the first node and the second node, then:

instructing the first node through the transceiver to report the characteristic information of the second node, so that the first node interacts with the second node over the backhaul link between the first node and the second node in response to the instruction to obtain the characteristic information of the second node, and sends the obtained characteristic information to the central node; or receiving the characteristic information of the second node sent by the second node through the transceiver.

Optionally the network device is the first node.

Optionally the processor is configured to read the programs in the memory, and to perform processes of:

measuring the adjacent nodes through the transceiver, and obtaining the network perceived information of the first node according to measurement information; and/or receiving, by the first node, broadcast messages sent by the adjacent nodes through the transceiver, and obtaining the network perceived information of the first node according to the received broadcast messages.

Optionally the processor is configured to read the programs in the memory, and to perform a process of:

interacting with the adjacent nodes of the first node over backhaul links between the first node and the adjacent nodes through the transceiver to obtain the characteristic information of the adjacent nodes of the first node.

Optionally there is a backhaul link between the first node and the central node, and the first node is not in a management domain of the central node; and the processor is configured to read the programs in the memory, and to perform a process of: if the adjacent nodes of the first node include a second node, wherein the second node is a node in the management domain of the central node, and there is no backhaul link between the first node and the second node, then interacting with the central node over the backhaul link between the first node and the central node through the transceiver to obtain the characteristic information of the second node.

Optionally the first node is not in a management domain of the central node; and the processor is configured to read the programs in the memory, and to perform a processes of:

if the adjacent nodes of the first node include a second node, wherein the second node is in the management domain of the central node, and there is a backhaul link between the first node and the second node, then:

interacting with the second node over the backhaul link between the first node and the second node through the transceiver to request for the characteristic information of the second node, and receiving the characteristic information of the second node, wherein the second node retrieves the characteristic information of the second node from the central node over the backhaul between the second node and the central node, and sends it to the first node; or interacting with the second node over the backhaul between the first node and the second node through the transceiver to obtain the characteristic information of the second node.

Optionally the processor is configured to read the programs in the memory, and to perform a process of:

when the transceiver receives an indicator that an adjacent node of the first node accesses or exits, or detects a movement of adjacent node of the first node, updating the environmental information map of the first node updating the environmental information map of the first node.

In the embodiments above, firstly the network perceived information is obtained, and the environmental information map is created according to the network perceived information; then the characteristic information of the first node is obtained; and further the first node is configured with the service policy according to the environmental information map, and the characteristic information of the first node, so that the network nodes exchange the information about their types and characteristics, and are configured with their service policies. On one hand, the environmental information map created from the network perceived information can reflect a condition of the nodes surrounding the node; and on the other hand, the obtained characteristic information of the nodes can further supplement the environmental information map, and the service policy can be configured by determining the service policy according to the environmental information map, and the characteristic information of the nodes, so that such an appropriate service policy can be determined that is adapted to the flexible and varying network architecture.

BRIEF DESCRIPTION OF THE DRAWINGS

In order to make the technical solutions in the embodiments of the invention more apparent, the drawings to be used in a description of the embodiments will be briefly introduced below, and apparently the drawings to be described below are merely illustrative of some embodiments of the invention, and those ordinarily skilled in the art can derive from these drawings other drawings without any inventive effort. In the drawings.

DETAILED DESCRIPTION OF THE EMBODIMENTS

Figure 1:
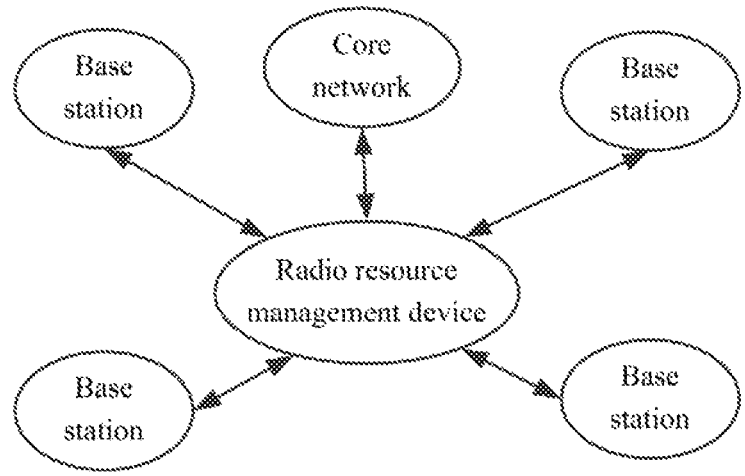
FIG. 1 is a schematic structural diagram of centralized networking in the prior art.

In order to make the objects, technical solutions and advantages of the invention more apparent, the invention will be further described in details with reference to the drawings. Apparently the described embodiments are only a part but all of the embodiments of the invention. Based upon the embodiments of the invention here, all of other embodiments derived by those ordinarily skilled in the art without any inventive effort shall come into the scope of the invention.

The embodiments of the invention provide a solution for configuring a service policy through network perception, and with the embodiments of the invention, a service policy is determined according to an environmental information map of a node, and characteristic information of the node, so that such an appropriate service policy can be determined that is adapted to a flexible and varying network architecture.

The embodiments of the invention can be applicable to networking in various architectures or of various types, e.g., centralized networking or distributed networking, or can be applicable to hybrid networking where both the centralized networking architecture and the distributed networking architecture exist. In an ultra-dense network, there are various types of network nodes densely populated in flexible and varying networking generally including centralized networking, distributed networking, hybrid networking, and other networking modes.

As centralized networking refers to, a central node controls a number of network nodes, and the central node manages and controls resources, and coordinates the network nodes or makes them cooperate with each other. As distributed networking refers to, there is no central node, and the network nodes are coordinated, or cooperate with each other, as a result of negotiation over a backhaul link. Hybrid networking refers to both centralized networking and distributed networking in combination.

The central node can manage a number of network nodes, and it is a higher-layer node which can be a logic entity or a standalone device. For example, the central node can be a standalone access network node, e.g., a local gateway or a local controller; the central node can be a core network node or an OAM node; the central node can be a base station which can manage a number of other base stations, where the base station an be regarded as a super base station; and the central node can be a baseband pool in a Centralized, Cooperative, Cloud Radio Access Network (C-RAN), and centrally process baseband signals of a number of Remote Radio Heads (RRHs).

The network nodes managed by the central node, and the network nodes in distributed networking can be various types of network nodes. For example, the network nodes can be base stations including macro base stations, e.g., eNBs, Node Bs (NBs) (base stations in third-generation communication), etc., or small base stations, e.g., Low Power Nodes (LPNs), pico base stations, femto base stations (home base stations), etc., or Access Points (APs); or the network nodes can be RRHs; or the network nodes can be enhanced User Equipments (UEs), e.g., UEs capable of relaying.

There may be one or more cells served by a base station, and in a dense deployment scenario, there is typically one cell served by a base station, which can be referred to as a small cell.

If the base station operates at a central frequency, then the base station will be allocated into one cell operating at a frequency that is the operating frequency (the central frequency) of the base station. If the base station operates at two or more central frequencies, then the base station will be allocated into two or more cells, the number of which is the number of operating frequencies of the base station, where an operating frequency of each cell is respective one of the operating frequencies of the base station.

In the ultra-dense network, the operating frequency of the base station is below 6 GHz, and a typical frequency band thereof includes 3.4 GHz to 3.6 GHz, or may be a high frequency band, for example, the operating frequency band includes 42-48 GHz and 59-64 GHz.

Figure 2:
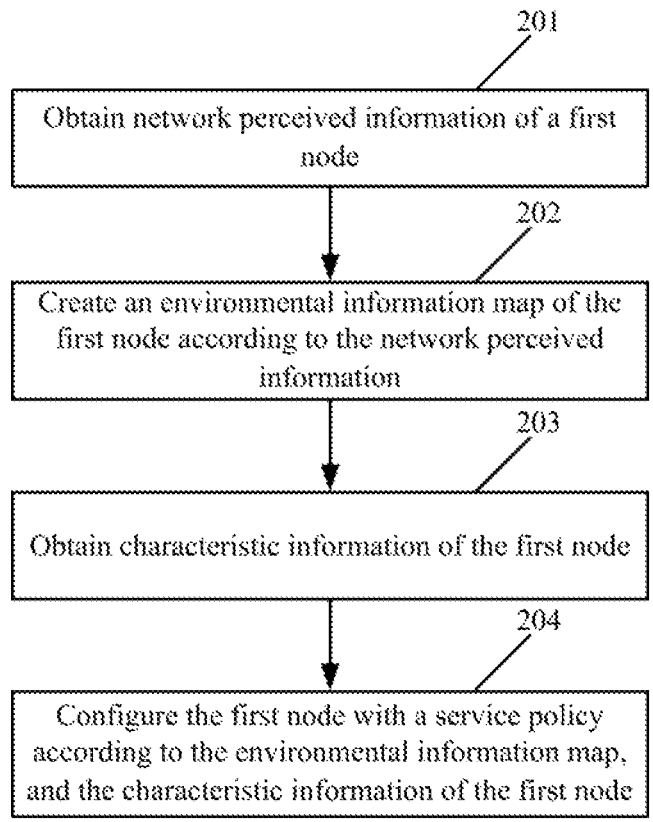
FIG. 2 is a schematic flow chart of configuring a service policy through network perception according to an embodiment of the invention.

FIG. 2 illustrates a flow of configuring a service policy through network perception, where the flow can be applicable to centralized networking, distributed networking, or hybrid networking, and the following flow is performed by different nodes in the different networking modes, for example, the flow can be performed by the central node in centralized networking or hybrid networking, or the flow can be performed by a base station in distributed networking or hybrid networking.

The flow illustrated in FIG. 2 will be described by way of an example, in which a service policy is configured by a first node, for the sake of a convenient description, where the first node can be any one network node, for which a service policy needs to be configured, in a network architecture.

As illustrated, the flow particularly includes the following steps:

The step S201 is to obtain network perceived information of a first node.

Preferably the network perceived information of the first node can include measurement information measured by the first node, and/or information obtained by the first node from broadcast messages of adjacent nodes. The measurement information measured by the first node is related information of the adjacent nodes of the first node, and the measurement information measured by the first node can include various types of information in different measurement configurations or different measurement modes, for example, the measurement information measured by the first node can include one or any combination of the following information: Reference Signal Received Power (RSRP), a Reference Signal Received Quality (RSRQ), a Signal to Interference plus Noise Ratio (SINR), an operating frequency, an operating bandwidth, a radio frequency capability, geographical positional coordinates, a cell identifier, etc.

The information obtained by the first node from the broadcast messages of the adjacent nodes is related information of the adjacent nodes of the first node, and can include various types of information in different measurement configurations or different measurement modes, for example, the measurement information measured by the first node can include one or any combination of the following information: transmission power, a radio frequency capability, geographical positional coordinates, a cell identifier, Time Division Duplex (TDD) configuration information, Multimedia Broadcast Multicast Service Single Frequency Network (MBSFN) configuration information, etc. The information above can be used to create an environmental information map, or to configure a service policy.

The step S202 is to create an environmental information map of the first node according to the network perceived information.

Here the environmental information map can reflect a relationship between some node and adjacent nodes, and/or related information of the adjacent nodes. For example, the environmental information map of the first node can represent one or any combination of the following information: relative positions between the first node and the adjacent nodes of the first node, a neighbor relation of the first node, spectrum use conditions of the adjacent nodes of the first node, etc.

Since the environmental information map includes various kinds of information, accordingly the environmental information map can also be created according to the network perceived information, by way of an example, the environmental information map of the first node can be determined in the following schemes:

In a first scheme, the relative positions between the first node and the adjacent nodes of the first node are determined according to the network perceived information, and the environmental information map of the first node is created, where the relative position can be represented as geographical positional coordinates, a path loss, a received signal strength, etc.;

In a second scheme, the neighbor relation of the first node is determined according to the network perceived information, and the environmental information map of the first node is created, where the neighbor relation can include proximate adjacent cells, adjacent interfering cells, adjacent cooperating cells, etc.;

In a third scheme, the spectrum use conditions of the adjacent nodes of the first node are determined according to the network perceived information, and the environmental information map of the first node is created;

In a fourth scheme, the relative positions between the first node and the adjacent nodes of the first node are determined according to the network perceived information, the neighbor relation of the first node is determined according to the relative positions, and the environmental information map of the first node is created according to the relative positions, and the neighbor relation of the first node;

In a fifth scheme, the relative positions between the first node and the adjacent nodes of the first node, and the spectrum use conditions of the adjacent nodes of the first node are determined according to the network perceived information, and the environmental information map of the first node is created;

In a sixth scheme, the neighbor relation of the first node is determined according to the network perceived information, the spectrum use conditions of the adjacent nodes of the first node are determined according to the neighbor relation of the first node, and the environmental information map of the first node is created according to the neighbor relation of the first node, and the spectrum use conditions of the adjacent nodes of the first node; and In a seventh scheme, the relative positions between the first node and the adjacent nodes of the first node determined according to the network perceived information, the neighbor relation of the first node is determined according to the relative positions, the spectrum use conditions of the adjacent nodes of the first node are determined according to the neighbor relation of the first node, and the environmental information map of the first node is created according to the relative positions, the neighbor relation, and the spectrum use conditions.

The step S203 is to obtain characteristic information of the first node.

Particularly characteristic information of the adjacent nodes of the first node can be obtained except for obtaining characteristic information of the first node, and the characteristic information of the adjacent nodes can be obtained by negotiating and interacting with the adjacent cells over backhaul links (wired or wireless). The characteristic information can be used to configure the first node with the service policy, and the first node can obtain the types and characteristics of the adjacent nodes thereof from the characteristic information.

Here characteristic information of a node typically refers to some inherent information of the node itself, e.g., configuration information, capability information, etc., of the node. By way of an example, characteristic information of a node can include one or any combination of the following information of the node: capability information (e.g., a capability level, transmission power, an antenna port, a radio frequency capability, a relay capability, etc.), a supported frequency, a supported bandwidth, a backhaul type, a backhaul characteristic (e.g., an ideal/non-ideal backhaul, delay and throughput characteristics of the backhaul, a capability level of the backhaul, etc.)

The step S204 is to configure the first node with a service policy according to the environmental information map, and the characteristic information of the first node.

Particularly the first node is configured with the service policy according to the environmental information map, and the characteristic information as described in the step S203.

Here a node can be configured with various service policies, for example, a node can be configured with an operating frequency, an operating bandwidth, or a cell identifier, or a role of the node in the network, a coordinative or cooperative relationship between the node and the other nodes, etc.

By way of an example, the first node can be configured with the service policy according to one or any combination of the relative positions of the first nodes to the adjacent nodes of the first nodes, the neighbor relation of the first node, and the spectrum use conditions of the adjacent nodes of the first node in the environmental information map created in the step S202, and the characteristic information obtained in the step S203, for example, an operating frequency and an operating bandwidth of the first node can be determined, the identifier of a cell can be selected for the first node, or a role of the first node in the network can be determined as being coordinated or interoperating with the other nodes to serve a user, for example, the first node and the adjacent nodes thereof cooperates with each other to collectively serve the user, and the first node negotiate with the adjacent nodes thereof, so that the adjacent nodes thereof provide the first node with a backhaul service.

The step S201 in the flow illustrated in FIG. 2 can particularly be performed in different ways in the different networking modes.

Particularly in centralized networking, the central node sends the measurement configuration to the first node, and the first node measures the adjacent nodes thereof according to the measurement configuration, and reports a measurement report message to the central node, where the measurement report message includes a part or all of the measurement information of the first node for the adjacent nodes. Alternatively the first node can receive the broadcast messages of the adjacent nodes thereof, and report the information obtained from the broadcast messages to the central node.

In distributed networking, the first node measures the adjacent nodes thereof, and store the information obtained from the measurement information; or the first node can receive the broadcast messages of the adjacent nodes thereof, and obtain and store the information from the broadcast messages.

In hybrid networking, the network perceived information may be obtained in a combination of the ways above in the particular network architecture.

The step S201 in the flow illustrated in FIG. 2 can particularly be performed in different ways in the different networking modes.

Particularly in centralized networking, there is a backhaul link between a network node managed by the central node, and the central node, where the backhaul link may be a wired link, e.g., an X2 interface-based backhaul link. The network node managed by the central node reports its characteristic information to the central node over the backhaul link between the network node and the central node, so that the central node can obtain the characteristic information of the respective network nodes in a management domain thereof.

In distributed networking, the respective network nodes interact over backhaul links between the network nodes, e.g., X2 interface or S1 interface-based backhaul links, to obtain characteristic information of each other.

In hybrid networking, the characteristic information of the nodes can be obtained in combination of the ways above in the particular network architecture. Furthermore if there may be a backhaul link between a node (e.g., a macro base station) which is not a node managed by the central node, and the central node, then the macro base station can obtain characteristic information of some node managed by the central node through the central node, or some node managed by the central node can obtain characteristic information of the macro base station through the central node.

Furthermore since a node in the network may vary over time, for example, a base station may be enabled or disabled, an AP may be plugged and played, a cell may be accessed or exited, etc., the environmental information map can be updated for the network node accessing, existing, moving, etc. By way of an example, if the central node, or the first node itself receives an indicator that an adjacent node of the first node accesses or exits, or detects a movement of adjacent node of the first node, then the environmental information map of the first node will be updated.

The flow illustrated in FIG. 2 may not be performed in any strict sequence, for example, if a network node in the management domain of the central node accesses the network, then it may report its characteristic information to the central node, measure, and report a measurement report message.

In the embodiment above, firstly the network perceived information is obtained, and the environmental information map is created according to the network perceived information; then the characteristic information of the first node and the adjacent nodes thereof is obtained; and further the first node is configured with the service policy according to the environmental information map, and the characteristic information of the first node and the adjacent nodes thereof, so that the network nodes exchange the information about their types and characteristics, and are configured with their service policies. On one hand, since the network perceived information can include measurement information measured by a node, and/or information obtained by the node from system broadcast messages of adjacent nodes, the environmental information map created from the network perceived information can reflect a condition of the nodes surrounding the node; and on the other hand, the obtained characteristic information of the nodes can further supplement the environmental information map, and the service policy can be configured by determining the service policy according to the environmental information map, and the characteristic information of the nodes, so that such an appropriate service policy can be determined that is adapted to the flexible and varying network architecture.

In order to better set forth the invention, implementations thereof in particular application scenarios will be provided below in connection with their particular networking architectures.

(I) An application in a scenario of centralized networking

Figure 3:
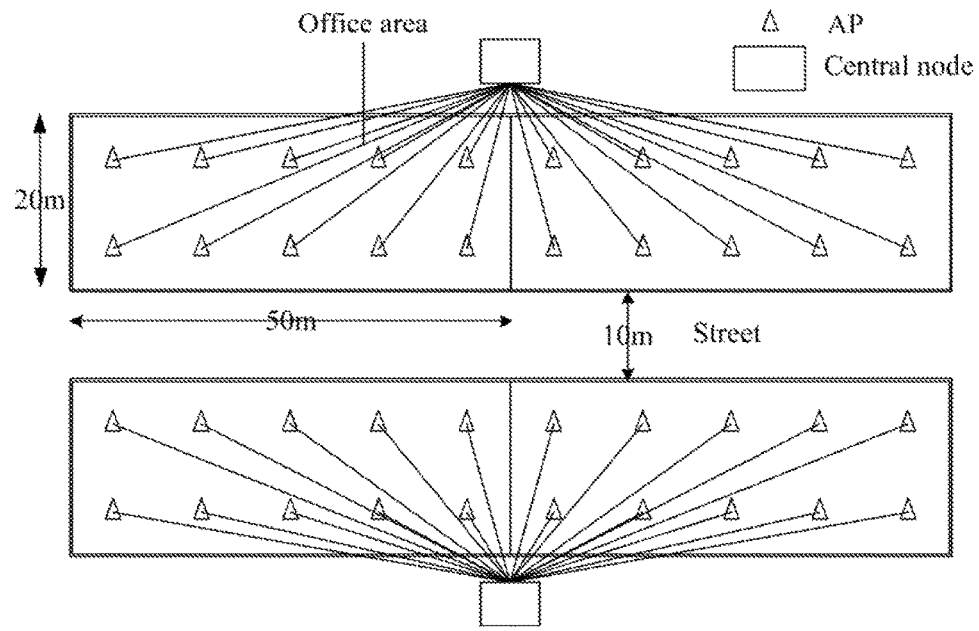
FIG. 3 is a schematic diagram of centralized networking according to an embodiment of the invention.

In centralized networking, base stations or APs are managed centrally by a central node, and FIG. 3 illustrates a schematic structural diagram of centralized networking, for example, all the APs in the same office area are managed by a central node.

Figure 4:
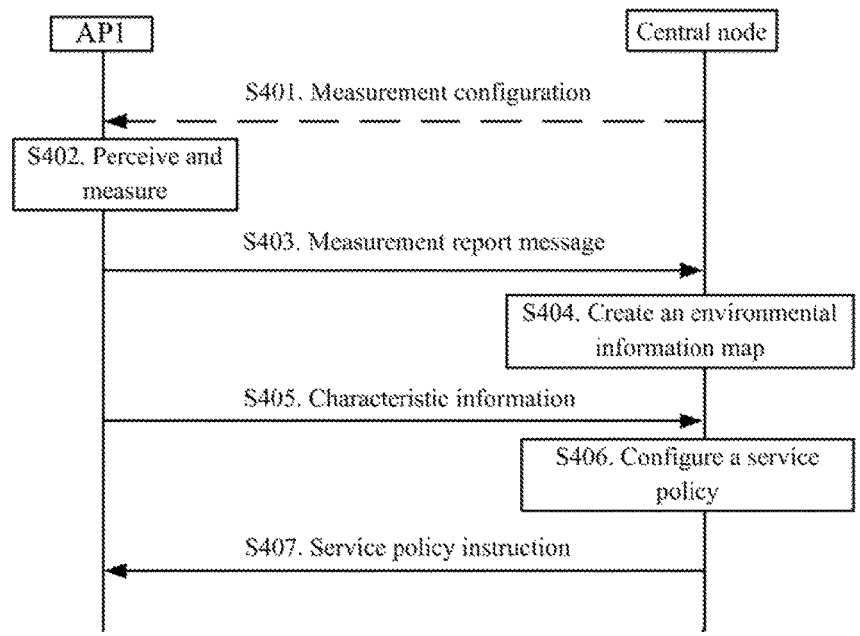
FIG. 4 is a schematic flow chart of configuring a service policy through network perception in centralized networking according to an embodiment of the invention.

FIG. 4 illustrates a flow of configuring a service policy through network perception in centralized networking, where the flow is performed by the central node. The flow will be described by way of an example in which the central node configures an AP1 with a service policy, and as illustrated, the flow includes the following particular steps:

In the step S401, the central node sends a measurement configuration to the AP1.

After the AP1 is powered on, the central node needs to send the measurement configuration to the AP1 to instruct the AP1 to measure and report.

In the step S402 and the step S403, the AP1 perceives and measures surrounding APs in its capability domain according to the measurement configuration sent by the central node, and then reports a measurement report message to the central node, where the measurement report message includes a part or all of measurement information of the AP1 for the surrounding APs.

Particularly after the AP1 is powered on, the AP1 measures the adjacent APs in its capability domain, and the AP1 measures Cell-Specific Reference Signals (CRS's) of the adjacent APs at respective frequencies, and reports the measurement report message to the central node, where the measurement report message includes a part or all of the measurement information measured by the AP1 for the APs. The measurement information includes the measurement frequencies, the identifiers of the adjacent cells, and RSRP measuring results, where the cell identifier can include a PCI, an E-UTRAN Cell Global Identifier (ECGI), etc.

In another implementation, the AP1 measures the adjacent APs according to the measurement configuration sent by the central node, and reports the measurement report message to the central node. By way of an example, the AP1 can measure the adjacent APs at the measurement frequencies configured by the central node, and report the identifiers of the adjacent cells, and the RSRP measurement results to the central node.

The AP1 can alternatively measure the adjacent APs according to the measurement frequencies and an RSRP threshold configured by the central node, and report the identifiers of the adjacent cells satisfying the RSRP threshold, and their RSRP measurement results to the central node.

The AP1 can alternatively measure the adjacent APs according to the measurement frequencies and Channel State Information-Reference Signal (CSI-RS) resources configured by the central node, and reports RSRP measurement results of the CSI-RS to the central node, where the different APs transmit the CSI-RS over the different CSI-RS resources.

In the step S404, the central node creates an environmental information map according to the measurement report message reported by the AP1, where the measurement report message includes a part or all of the measured measurement information, where the measurement information can include the operating frequencies, the PCIs, the ECGIs, and other measurement results of the adjacent node.

The measurement information in the measurement report message will be further described below in the following two schemes. Of course, the following two schemes will be described merely by way of an example, but the invention will not be limited thereto.

In a first scheme, the AP1 measures without any measurement configuration from the central node.

The AP1 perceives and measures surrounding APs in its capability domain (at different frequencies), measures and detects 8 adjacent APs (with a detection capability of 8), and obtains their operating frequencies, cell identifiers, and RSRP measurement results.

The AP1 reports all the frequencies, the cell identifiers, and the RSRP measurement results of the 8 adjacent APs to the central node, that is, the measurement report message includes all the measured measurement information.

In a second scheme, the central node sends the measurement configuration including the measurement frequencies and the RSRP threshold.

The AP1 perceives and measures the surrounding APs at the configured measurement frequencies, measures and detects 8 adjacent APs (with a detection capability of 8), and obtains their cell identifiers and RSRP measurement results.

The AP1 compares the RSRP measurement results of the 8 adjacent APs with the threshold, and obtain 5 adjacent APs satisfying the threshold.

The AP1 reports the cell identifiers and the RSRP measurement results of the 5 adjacent APs to the central node, where the measurement report message includes only a part of the measured measurement information.

The central node can create the environmental information map in any one of the following ways:

The central node can obtain received signal strengths between the AP1 and the adjacent APs according to the RSRP measurement results, or obtain path losses between the AP1 and the adjacent APs according to the RSRP measurement results, and transmission power of the adjacent APs, or search for and obtain geographical position coordinates of the adjacent APs (the geographical positional coordinate information is obtained and stored by the central node in advance) using their identifiers, and thereby create the relative positions between the AP1 and the adjacent APs.

The central node can alternatively determine a neighbor relation of the AP1 according to information about relative positions between the AP1 and the adjacent APs, or a part or all of the measurement information in the measurement report message reported by the AP1, where the neighbor relation can include a list of adjacent cells, a set of adjacent interfering cells, a set of adjacent cooperating cells, etc. For example, adjacent APs measured and reported by the AP1 constitute the list of adjacent cells, adjacent APs satisfying the RSRP threshold among the RSRP measurement results constitute the set of adjacent interfering cells, and the first N adjacent APs ranked in a descending order among the RSRP measurement results constitute the set of adjacent cooperating cells.

The central node can alternatively determine spectrum use conditions of the adjacent nodes of the AP1 according to the neighbor relation of the AP1, and the operating frequencies and the operating bandwidths of the adjacent AP in the measurement report message.

In the step S405, the network nodes in a management domain of the central node report their characteristic information to the central node over backhaul links.

There are wired backhaul links, e.g., optic fiber direct links, between the network nodes managed by the central node (including the AP1 and the adjacent node thereof), and the central node. The AP1 and the adjacent nodes thereof can report their capability information, supported frequencies and bandwidths, etc., to the central node over their backhaul links to the central node. For example, the capability information reported by the AP1 includes transmission power of 24 dBm, 8 antenna ports, 2 sets of radio frequency links, etc., supported frequencies of 3.4 GHz to 3.6 GHz, and supported bandwidths of 20 MHz and 40 MHz. Typically a network node managed by the central node reports characteristic information to the central node when the network node is powered on, or a cell is activated.

In the step S406, the central node configures the AP1 with a service strategy according to the environmental information map, and the characteristic information of the AP1.

By way of an example, the central node can allocate an operating frequency and an operating bandwidth for the AP1 according to the set of adjacent interfering cells of the AP1, and the spectrum use conditions of the adjacent APs thereof together with the supported frequencies and the supported bandwidths of the AP1 to thereby alleviate interference between the AP1 and the adjacent APs so as to improve the throughput of users served by the AP1.

The central node can further allocate an appropriate cell identifier PCI for the AP1 according to the list of adjacent cells of the AP1, and the identifiers PCIs of the adjacent cells.

The central node can further allocate Physical Resource Blocks (PRBs), power, and other resources for the AP1, and the APs in the set of adjacent cooperating cells of the AP1 according to the set of adjacent cooperating cells together with loads of the AP1, and the APs in the set of adjacent cooperating cells, so that the AP1, and the APs in the set of adjacent cooperating cells cooperate with each other to collectively serve the users so as to improve the spectrum efficiency of the users.

In the step S407, after the central node configures the AP1 with the service policy, the central node sends a service policy instruction to the AP1 to instruct the AP1 to configure the service policy.

Furthermore if an adjacent AP of the AP1 is powered off, or an adjacent cell is deactivated, then the adjacent AP or the adjacent cell will send an exit instruction to the central node. Accordingly the central node can update the environmental information map of the AP1. For example, if the adjacent node AP2 of the AP1 is deactivated, then the central node will delete the AP2 from the list of adjacent cells of the AP1, and mark the spectrum which was accessed by the AP2 as Unoccupied; and if there is a new AP3 powered on, then if the list of adjacent cells of the AP3 includes the AP1, then the central node will update the environmental information map of the AP1, add the AP3 to the list of adjacent cells of the AP1, and mark the spectrum accessed by the AP3 as Occupied.

Furthermore if some prior static information, e.g., geographical positional information (e.g., geographical positional coordinates), capability information (e.g., capability levels, transmission power, antenna ports, radio frequency capabilities, relay capabilities, etc.), supported frequencies, supported bandwidths, and other information of the APs, is stored in the central node, then an interaction process can be simplified, where the measurement frequencies can be configured according to the operating frequencies and the operating bandwidth capabilities of the base stations.

As can be apparent from the embodiments above, in centralized networking, the central node obtains the measurement report message and the characteristic information reported by the AP1, then creates the environmental information map of the AP1 according to the measurement report message reported by the AP1, and further configures the AP1 with the service policy according to the characteristic information and the measurement report message reported by the AP1, so that the AP1 and the APs connected therewith exchange their node types and characteristics with each other to collectively serve the user for the purpose of an effectual access to the flexible and varying network.

The embodiment above has been described for centralized networking in which the central node can obtain the network perceived information by receiving information reported by a node managed by the central node, for example, receiving such information reported by the AP1 that includes the information obtained by the AP1 from broadcast messages sent by adjacent nodes, where the nodes adjacent to the AP1 may or may not be nodes managed by the central node, and if the adjacent nodes are not managed by the central node, then this will relate to hybrid networking. More preferably the network perceived information can be obtained in this way together with the step S402, that is, the central node obtains the network perceived information by receiving the measurement report message reported by the AP1, and the information, reported by the AP1, which is obtained by the AP1 from the broadcast messages sent by the adjacent nodes.

(II) An application in a scenario of distributed networking

Figure 5:
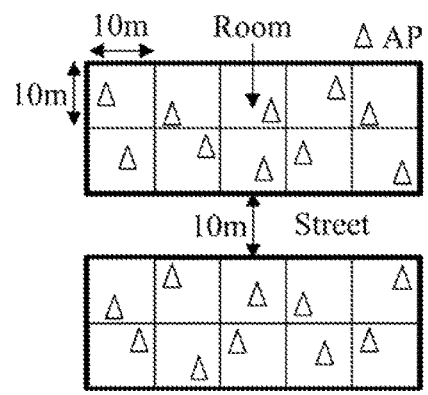
FIG. 5 is a schematic diagram of distributed networking according to an embodiment of the invention.
Figure 6:
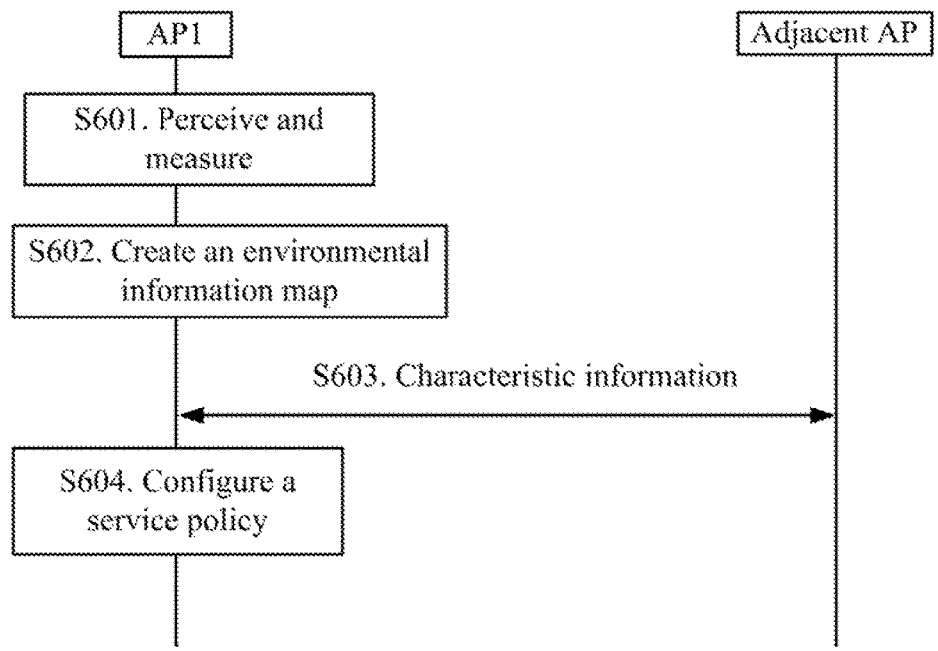
FIG. 6 is a schematic flow chart of configuring a service policy through network perception in distributed networking according to an embodiment of the invention.

In distributed networking, a base station configures a service policy for itself. FIG. 5 illustrates a schematic structural diagram of distributed networking, where there are a number of APs distributed in a number of rooms, and the APs can be managed by themselves. FIG. 6 illustrates a flow of configuring a service policy through network perception in distributed networking, where the flow is performed by an AP1, and as illustrated, the flow particularly includes the following steps:

In the step S601, After an AP1 is powered on, the AP1 perceives surrounding APs in a capability domain thereof, and obtains network perceived information.

For example, the AP1 measures CRS of the adjacent APs at different frequencies, and obtains and stores the identifiers of adjacent cells, and their RSRP measurement results, where the cell identifier can include a PCI, an ECGI, a Subscriber Identity Module (SIM) number, IPv6, and other information.

The AP1 can alternatively measure CRS of the adjacent APs at different frequencies, and store the identifiers of adjacent cells satisfying an RSRP threshold, and their RSRP measurement results.

The AP1 can alternatively measure CRS of the adjacent APs at different frequencies, and store the identifiers of the first N adjacent cells ranked in a descending order of RSRP, and their RSRP measurement results.

The AP1 can alternatively read broadcast messages of the adjacent APs, and obtain and store general information of the adjacent APs. The general information includes transmission power, operating bandwidths, geographical positional coordinates, whether they belong to a Closed Subscriber Group (CSG), etc.

The AP1 can further measure the surrounding APs periodically, and obtain and store immobile or mobile states of the adjacent APs.

In the step S602, the Ap1 identifies adjacent APs thereof according to the obtained network perceived information, and creates an environmental information map, where the obtained network perceived information can include operating frequencies, PCIs, ECGIs, SIM numbers, measurement results, general information, etc., of the adjacent nodes of the AP1, for example.

The AP1 can create the environmental information map in one of the following ways:

The AP1 can obtain received signal strengths between the AP1 and the adjacent APs according to the RSRP measurement results, or obtain path losses between the AP1 and the adjacent APs according to the RSRP measurement results, and transmission power of the adjacent APs, or create the relative positions between the AP1 and the adjacent APs according to geographical position coordinates obtained from broadcast messages of the adjacent APs.

The AP1 can determine a neighbor relation thereof according to the environmental information map, or the relative positions between the AP1 and the adjacent APs, where the neighbor relation includes a list of adjacent cells, a set of adjacent interfering cells, a set of adjacent cooperating cells, etc. For example, adjacent APs measured by the AP1 constitute a list of adjacent cells, adjacent APs satisfying the RSRP threshold among the RSRP measurement results constitute a set of adjacent interfering cells, and the first N adjacent APs ranked in a descending order among the RSRP measurement results constitute a set of adjacent cooperating cells; and the AP1 determines spectrum use conditions of APs connected therewith according to the neighbor relation thereof, and the operating frequencies and the operating bandwidths of the measured adjacent APs.

In the step S603, the AP1 interacts with the adjacent APs over backhaul links between the AP1 and the adjacent APs, and obtain characteristic information of the adjacent APs, where the backhaul links between them are typically wireless backhauls.

The AP1 can obtain the characteristic information of the adjacent nodes in an interaction and negotiation procedure. By way of an example, after the AP1 determines adjacent AP thereof, the AP1 can send a request to the adjacent APs of the AP1 to request for characteristic information of the adjacent APs, so that the adjacent APs of the AP1 send their characteristic information to the AP1. Characteristic information of a node can include capability information, supported frequencies and a supported bandwidth, a type of backhaul, and other information of the node. For example, the characteristic information of the adjacent node AP2 of the AP1 obtained by the AP1 can include transmission power of 24 dBm, four antenna ports, a relay capability, supported frequencies of 3.4 GHz to 3.6 GHz, a supported bandwidth of 100 MHz, a one-way backhaul delay of 10 to 30 ms, and a throughput of 10 Gbps.

In the step S604, the AP1 configures a service policy for itself according to the environmental information map, and the characteristic information of the adjacent APs, or can coordinate resources with the other APs to thereby better serve their users.

By way of an example, the AP1 can select its operating frequency and operating bandwidth according to its set of adjacent interfering cells, and the spectrum use conditions of the adjacent APs together with its supported frequencies and supported bandwidth to thereby alleviate interference between the AP1 and the adjacent APs so as to improve the throughput of users served by the AP1.

The AP1 can further select an appropriate cell identifier PCI for itself according to its list of adjacent cells, and the identifiers PCIs of the adjacent cells.

The AP1 can negotiate with the AP2 according to the relay capability, the supported frequencies, the supported bandwidth, the type of backhaul, and the characteristic of the AP2 together with load and traffic conditions of the AP1, so that the AP2 provides the AP1 with a backhaul service. If there is no sufficient backhaul resource available from the AP2, then the AP1 can further negotiate with the other APs in the neighbor relation, so that there are a number of APs providing the AP1 with a backhaul service.

Furthermore a change to the neighbor relation of the AP1 can be detected by the AP1 periodically measuring, or can be notified to the AP1 by an adjacent AP sending an access or exit indicator to the AP1, so that the AP1 can update the environmental information map thereof according to the changing neighbor relation thereof.

For example, if the connected node AP2 in the list of adjacent cells of the AP1 is powered on, or a cell in the list of adjacent cells is deactivated, then the AP2 will send an exit indicator to the AP1. The AP1 deletes the AP2 from the list of adjacent cells thereof, and marks the spectrum which was accessed by the AP2 as Unoccupied.

In another example, if there is a new AP3 powered on, or a new cell activated, then if the list of adjacent cells of the AP3 includes the AP3, then the AP3 will send an access indicator to the AP1, and the AP1 will update its environmental information map, add the AP3 to the list of adjacent cells thereof, and mark the spectrum accessed by the AP3 as Occupied.

In a further example, if the AP4 in the list of adjacent cells of the AP1 is moving, then the AP1 will update the environmental information map thereof, and update the relative position between the AP1 and the AP4.

As can be apparent from the embodiments above, in distributed networking, the AP1 obtains the network perceived information of the adjacent APs, then creates the environmental information map of the AP1 according to the network perceived information of the adjacent APs, and further configures the service policy for itself according to the characteristic information of the adjacent APs obtained as a result of interaction, and the environmental information map of the AP1, so that the AP1 and the APs connected therewith exchange their node types and characteristics with each other to collectively serve the user for the purpose of an effectual access to the flexible and varying network.

(III) An application in a scenario of hybrid networking

Figure 7:
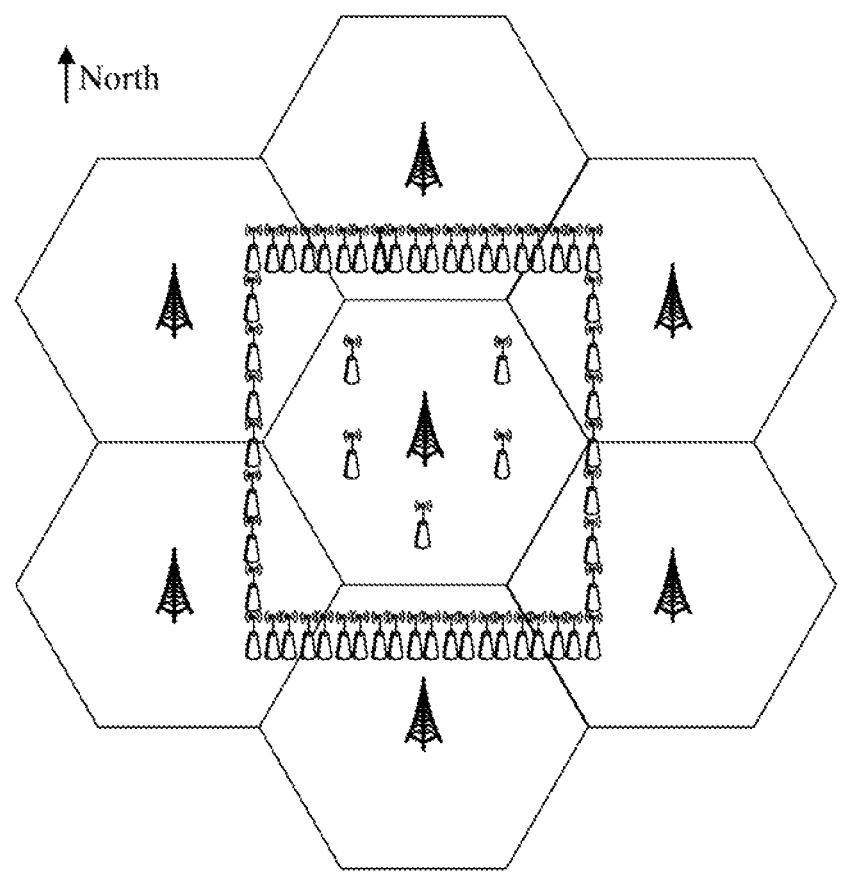
FIG. 7 is a schematic diagram of a scenario in hybrid networking according to an embodiment of the invention.

In hybrid networking, both the distributed networking architecture and the centralized networking architecture operate in combination, for example, a part of base stations are managed by a central node, and the other part of the base stations are not managed by the central node. FIG. 7 is a schematic diagram of a scenario in hybrid networking, where there is a square with a longitudinal length of 880 meters, and a latitudinal length of 550 meters, the square of which is 440 thousands of square meters, where a grand congregation of at most 400 thousands of attendants can be held. Small base stations are deployed densely on the boundary of the square, where they can be arranged on road lamps, and managed centrally by the central node; and a number of small base stations are deployed randomly across the square, where they can be arranged on communication engineering vehicles; and a macro base station is deployed across or around the square, where it operates in the same or different frequency bands as or from those of the small base stations.

Figure 8:
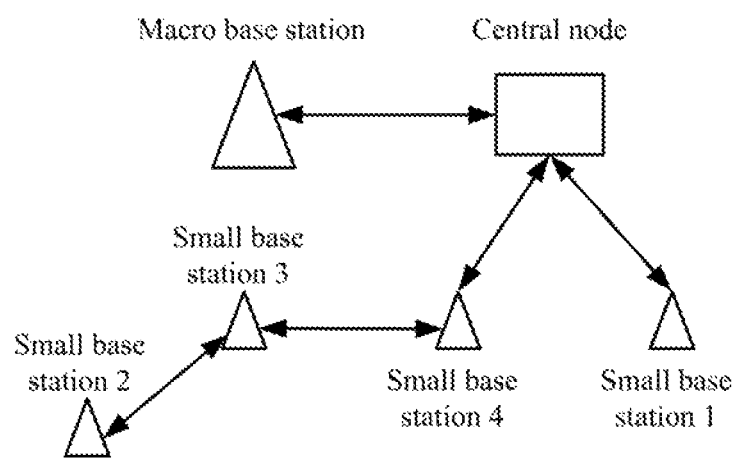
FIG. 8 is a schematic diagram of nodes distributed in hybrid networking according to an embodiment of the invention.

FIG. 8 illustrates a schematic diagram of nodes distributed in hybrid networking, where a central node can manage a small base station 1 and a small base station 4; nodes in distributed networking include a small base station 2 and a small base station 3; there are a backhaul link between the small base station 3 and the small base station 4, a wired backhaul between a macro base station and a central node, a wired backhaul between the central node and the small base station 1, and a wired backhaul link between the central node and the small base station 4; and all of the macro base station, the small base station 1, and the small base station 4 can negotiate and interact with the central node. There are a wireless backhaul between the small base station 2 and the small base station 3, and a wireless backhaul between the small base station 3 and the small base station 4; and both the small base station 2 and the small base station 4 can negotiate and interact with the small base station 3.

Several particular scenarios will be described below in the networking architecture illustrated in FIG. 8.

In a first scenario, the central node configures the small base station 1 with a service policy.

The central node obtains network perceived information reported by the small base station 1, where the central node obtains the network perceived information in the same way as it obtains the network perceived information in centralized networking, so a repeated description thereof will be omitted here. The central node creates an environmental information map according to the obtained network perceived information, where the small base station 4 is an adjacent node of the small base station 1 in the created network perceived information; and the central node obtains characteristic information reported by the small base station 1 and the small base station 4, and configures the small base station 1 with a service policy according to the obtained characteristic information, and the created environmental information map.

In a second scenario, the small base station 2 configures a service policy for itself.

The small base station 2 obtains network perceived information of adjacent nodes including the small base station 3, where the small base station 2 obtains the network perceived information in the same way as it obtains the network perceived information in distributed networking, so a repeated description thereof will be omitted here. The small base station 2 creates an environmental information map according to the obtained network perceived information, where the small base station 3 is an adjacent node of the small base station 2 in the created network perceived information. The small base station 2 is located in distributed networking, and the small base station 2 interacts with the small base station 3 over the wireless backhaul between the small base station 2 and the small base station 3, and obtains characteristic information of the small base station 3. The small base station 2 configures its service policy according to the environmental information map, and the characteristic information of the adjacent nodes thereof (including the small base station 3).

In a third scenario, the small base station 3 configures a service policy for itself.

The small base station 3 obtains network perceived information of adjacent nodes including the small base station 2 and the small base station 4, where the small base station 3 obtains the network perceived information in the same way as it obtains the network perceived information in distributed networking, so a repeated description thereof will be omitted here. The small base station 3 creates an environmental information map according to the obtained network perceived information. Since the small base station 2 is a node in distributed networking, the small base station 3 can obtain characteristic information of the small base station 2 directly over the wireless backhaul link between the small base station 3 and the small base station 2. The small base station 3 can obtain character sic information of the small base station 4 directly over the wireless backhaul link between the small base station 3 and the small base station 4. The small base station 2 configures its service policy according to the environmental information map, and the characteristic information of the adjacent nodes thereof. This scenario will be applicable in the case that there is a high management capability of the small base station 4, or that the central node does not manage strictly the small base station 4 in operation, for example, the small base station 4 is an AP, a home base station, or another device.

In another scenario, the small base station 3 interacts with the small base station 4 over the wireless backhaul between the small base station 3 and the small base station 4, and requests for chrematistic information of the small base station 4, and then the small base station 4 requests the central node for retrieving its characteristic information over the wired backhaul link between the small base station 4 and the central node, and sends its characteristic information retrieved from the central node to the small base station 3, so that the small base station 3 obtains the characteristic information of the small base station 4. The small base station 3 configures its service policy according to the environmental information map, the characteristic information of the adjacent nodes, and the characteristic information of the small base station 4. This scenario will be applicable in the case that there is a low capability of the small base station 4, e.g., a radio frequency remote unit, or that the central node needs to manage strictly the small base station 4 in operation.

In a fourth scenario, the central node configures the small base station 4 with a service policy.

The central node obtains network perceived information of the small base station 1, the small base station 3, and the macro base station reported by the small base station 4, and creates an environmental information map according to the network perceived information. The central node obtains characteristic information of the small base station 1, the small base station 3, and the macro base station respectively. The central node configures a service policy of the small base station 4 according to the obtained characteristic information of the small base station 1, the small base station 3, the small base station 4, and the macro base station, and the environmental information map.

For the central node to obtain the characteristic information of the small base station 1 and the small base station 4, since both the small base station 1 and the small base station 4 are managed by the central node, the small base station 1 and the small base station 4 can report their characteristic information directly to the central node, so that the central node can obtain the characteristic information of the small base station 1 and the small base station 4.

For the central node to obtain the characteristic information of the macro base station, since there is a wired backhaul link between the central node and the macro base station, the central node interacts with the macro base station over the wired backhaul link between the central node and the macro base station, and obtains the characteristic information of the macro base station.

The central node can obtain the characteristic information of the small base station 3 in the following two cases:

In a first case, since there is a backhaul link between the small base station 3 and the small base station 4, they can exchange their characteristic information with each other, the small base station 4 can obtain the characteristic information of the small base station 3 over the wireless backhaul link between the small base station 4 and the small base station 3, and send it to the central node. By way of an example, the small base station 3 requesting for cooperating with the small base station 4 can carry the characteristic information of the small base station 3 in a cooperation request message, and send the cooperation request message to the small base station 4, and the small base station 4 can send the cooperation request message to the central node to request the central node for a cooperation decision; or the small base station 4 requesting for cooperating with the small base station 3 can send a cooperation request message to the small base station 3, receive a response message, returned by the small base station 3, carrying the characteristic information of the small base station 3, and send the characteristic information of the small base station 3 to the central node. Only an instance has been described above, but the small base station 3 can obtain the characteristic information of the small base station 3 over the backhaul link between the small base station 3 and the small base station 4, and report it to the central node, as long as the backhaul link is active. This instance will be applicable in the case that there is a high management capability of the small base station 4, or that the central node does not manage strictly the small base station 4 in operation, for example, the small base station 4 is an AP, a home base station, or another device.

In a second case, the central node interacts with the small base station 4 between the wired backhaul link between the central node and the small base station 4, and instructs the small base station 4 to report the characteristic information of the small base station 3, and the small base station 4 obtains the characteristic information of the small base station 3 from the small base station 3 over the wireless backhaul link between the small base station 4 and the small base station 3 in response to the instruction, and reports the obtained characteristic information of the small base station 3 to the central node. This instance will be applicable in the case that there is a low capability of the small base station 4, e.g., a radio frequency remote unit, or that the central node needs to manage strictly the small base station 4 in operation.

In a fifth scenario, the macro base station configures a service policy for itself.

The macro base station obtains network perceived information, where the macro base station obtains the network perceived information in the same way as it obtains the network perceived information in distributed networking, so a repeated description thereof will be omitted here. The macro base station creates an environmental information map according to the obtained network perceived information, where the small base station 4 is an adjacent node of the macro base station in the created network perceived information. However since there is no backhaul link between the macro base station and the small base station 4, the macro base station interacts with the central node over the backhaul link between the macro base station and the central node, and requests the central node for characteristic information of the small base station 4 (the small base station 4 has reported its characteristic information to the central node), and after the macro base station obtains characteristic information of adjacent nodes including the small base station 4 from the central node, the macro base station configures a service policy for itself according to the environmental information map created by the macro base station, and the characteristic information of the macro base station and the adjacent nodes thereof.

Figure 9:
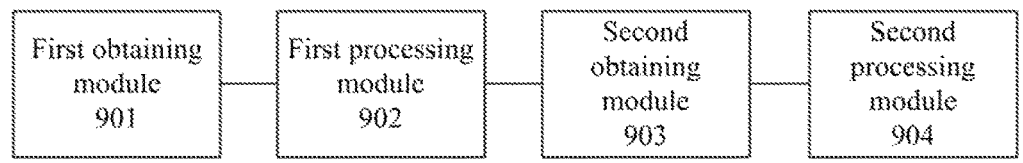
FIG. 9 is a schematic structural diagram of a network device according to an embodiment of the invention.

Based upon the same technical idea, FIG. 9 illustrates a network device which can be applicable to the flow illustrated in FIG. 2. The device can be a central node, or can be a base station. The device includes:

A first obtaining module 901 is configured to obtain network perceived information of a first node;

A first processing module 902 is configured to create an environmental information map of the first node according to the network perceived information;

A second obtaining module 903 is configured to obtain characteristic information of the first node; and A second processing module 904 is configured to configure the first node with a service policy according to the environmental information map, and the characteristic information of the first node.

Preferably the network perceived information includes measurement information measured by the first node, and/or information obtained by the first node from broadcast messages of adjacent nodes.

Preferably the measured measurement information includes one or any combination of the following information:

A signal strength, a signal quality, an operating frequency, an operating bandwidth, a radio frequency capability, geographical positional coordinates, and a cell identifier; and The information obtained from the broadcast message of an adjacent node includes one or any combination of the following information:

Transmission power, a radio frequency capability, geographical positional coordinates, a cell identifier, TDD configuration information, and MBSFN configuration information.

Preferably the second obtaining module 903 is further configured to obtain characteristic information of adjacent nodes of the first node; and the second processing module 904 is configured to configure the first node with the service policy according to the environmental information map, and the characteristic information of the first node, and the adjacent nodes of the first node.

Preferably the network device is a central node; and

A management domain of the central node includes the first node.

Preferably the first obtaining module 901 is configured:

To receive a measurement report message reported by the first node, where the measurement report message includes a part or all of measurement information of the first node for the adjacent nodes; and/or To receive information reported by the first node, where the reported information includes information obtained by the first node from broadcast messages sent by the adjacent nodes.

Preferably the second obtaining module 903 is configured:

To receive the characteristic information of the first node, and the adjacent nodes of the first node reported by the respective nodes.

Preferably the second obtaining module 903 is configured:

If the adjacent nodes of the first node include a second node, where the second node is not in the management domain of the central node, and there is a backhaul link between the second node and the central node, to interact with the second node over the backhaul link between the central node and the second node to obtain the characteristic information of the second node.

Preferably the first node is in the management domain of the central node; and

The second obtaining module 903 is configured:

If the adjacent nodes of the first node include a second node, where the second node is not in the management domain of the central node, and there is a backhaul link between the first node and the second node, To instruct the first node to report the characteristic information of the second node, so that the first node interacts with the second node over the backhaul link between the first node and the second node in response to the instruction to obtain the characteristic information of the second node, and sends the obtained characteristic information to the central node; or To receive the characteristic information of the second node sent by the first node.

Preferably the network device is the first node.

Preferably the first obtaining module 901 is configured:

To measure the adjacent nodes, and to obtain the network perceived information of the first node according to measurement information; and/or To receive broadcast messages sent by the adjacent nodes, and to obtain the network perceived information of the first node according to the received broadcast messages.

Preferably the second obtaining module 903 is configured:

To interact with the adjacent nodes of the first node over backhaul links between the first node and the adjacent nodes to obtain the characteristic information of the adjacent nodes of the first node.

Preferably there is a backhaul link between the first node and the central node, and the first node is not in a management domain of the central node; and The second obtaining module 903 is configured:

If the adjacent nodes of the first node include a second node, where the second node is a node in the management domain of the central node, and there is no backhaul link between the first node and the second node, to interact with the central node over the backhaul link between the first node and the central node to obtain the characteristic information of the second node.

Preferably the first node is not in the management domain of the central node; and The second obtaining module 903 is configured:

If the adjacent nodes of the first node include a second node, where the second node is in the management domain of the central node, and there is a backhaul link between the first node and the second node, To interact with the second node over the backhaul link between the first node and the second node to request for the characteristic information of the second node, and to receive the characteristic information of the second node, where the second node retrieves the characteristic information of the second node from the central node over the backhaul between the second node and the central node, and sends it to the first node; or To interact with the second node over the backhaul between the first node and the second node to obtain the characteristic information of the second node.

Preferably the environmental information map of the first node represents one or any combination of the following information:

Relative positions between the first node and adjacent nodes of the first node;

A neighbor relation of the first node; and

Spectrum use conditions of the adjacent nodes of the first node.

Preferably the first processing module 902 is further configured:

To update the environmental information map of the first node upon reception of an indicator that an adjacent node of the first node accesses or exits, or upon detecting a movement of adjacent node of the first node.

Preferably the characteristic information includes one or any combination of the following information:

Capability information, supported frequencies, a supported bandwidth, the type of a backhaul link, and the characteristic of the backhaul link.

Figure 10:
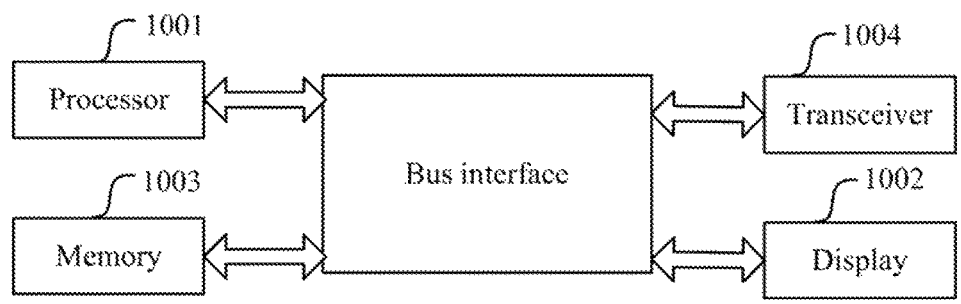
FIG. 10 is a schematic structural diagram of another network device according to an embodiment of the invention.

FIG. 10 is a schematic structural diagram of another network device according to an embodiment of the invention, where the device can perform the method according to the embodiments above of the invention. The device can include any number of interconnecting buses and bridges to particularly link together various circuits including one or more processors represented by a processor 1001, and one or more memories represented by the memory 1003. The bus architecture can further link together various other circuits, e.g., prophetical devices, manostats, power management circuits, etc., all of which are well known in the art, so a further description thereof will be omitted in this context. The bus interface serves as an interface. A transceiver 1004 can be a number of elements including a transmitter and a receiver which are units for communication with various other devices over a transmission medium. The processor 1001 is responsible for managing the bus architecture and performing normal processes, and the memory 1003 can store data for use by the processor 1001 in performing the operations. A display 1002 can be a Cathode Ray Tube (CRT) display, a Plasma Display Panel (PDP) display, a Digital Light Processing (DLP) display, a Liquid Crystal Display (LCD) display, or another display device.

The processor 1001 is configured to read the program in the memory 1003, and to perform the processes of: obtaining network perceived information of a first node through the transceiver 1004, where the network perceived information includes measurement information measured by the first node, and/or information obtained by the first node from broadcast messages of adjacent nodes. Particularly the transceiver 1004 is configured to receive a measurement report message reported by the first node, where the measurement report message includes a part or all of the measurement information of the first node for the adjacent nodes; and/or to receive information reported by the first node, where the reported information includes the information obtained by the first node from the broadcast messages sent by the adjacent nodes.

The processor 1001 can be configured to create an environmental information map of the first node according to the network perceived information obtained by the transceiver 1004, where the environmental information map represents one or any combination of the following information: relative positions between the first node and the adjacent nodes of the first node; a neighbor relation of the first node; and spectrum use conditions of the adjacent nodes of the first node. The processor 1001 is configured to update the environmental information map of the first node upon reception of an indicator that an adjacent node of the first node accesses or exits, or upon detecting a movement of adjacent node of the first node.

The transceiver 1004 is configured to obtain characteristic information of the first node, and the adjacent nodes of the first node. Particularly if the adjacent nodes of the first node include a second node, where the second node is not in a management domain of a central node, and there is a backhaul link between the second node and the central node, then the transceiver 1004 will be configured to interact with the second node over the backhaul link between the central node and the second node to obtain the characteristic information of the second node.

If the adjacent nodes of the first node include a second node, where the second node is not in a management domain of a central node, and there is a backhaul link between the first node and the second node, then:

The transceiver 1004 will be configured to instruct the first node to report the characteristic information of the second node, so that the first node interacts with the second node over the backhaul link between the first node and the second node in response to the instruction to obtain the characteristic information of the second node, and sends the obtained characteristic information to the central node; or to receive the characteristic information of the second node sent by the first node.

The processor 1001 is configured to configure the first node with a service policy according to the environmental information map, and the characteristic information of the first node, and the adjacent nodes of the first node.

The memory 1003 is configured to store one or more executable programs for configuring the processor 1001.

Figure 11:
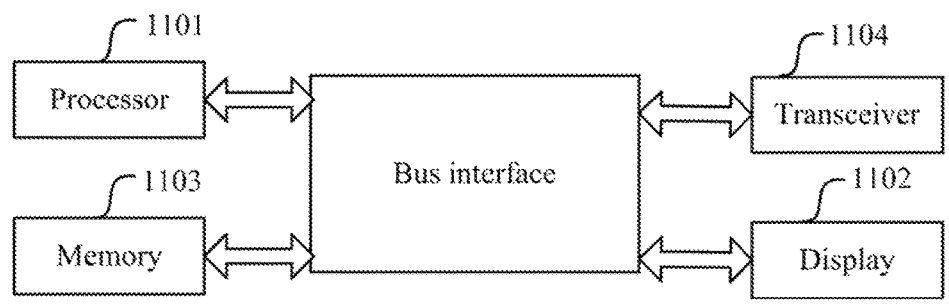
FIG. 11 is a schematic structural diagram of another network device according to an embodiment of the invention.

FIG. 11 is a schematic structural diagram of another network device according to an embodiment of the invention, where the device can perform the method according to the embodiments above of the invention. The device can include any number of interconnecting buses and bridges to particularly link together various circuits including one or more processors represented by a processor 1101, and one or more memories represented by the memory 1103. The bus architecture can further link together various other circuits, e.g., prophetical devices, manostats, power management circuits, etc., all of which are well known in the art, so a further description thereof will be omitted in this context. The bus interface serves as an interface. A transceiver 1104 can be a number of elements including a transmitter and a receiver which are units for communication with various other devices over a transmission medium. The processor 1101 is responsible for managing the bus architecture and performing normal processes, and the memory 1103 can store data for use by the processor 1101 in performing the operations. A display 1102 can be a CRT display, a PDP display, a DLP display, an LCD display, or another display device.

The processor 1101 is configured to read the program in the memory 1103, and to perform the processes of: obtaining network perceived information of a first node through the transceiver 1104, where the network perceived information includes measurement information measured by the first node, and/or information obtained by the first node from broadcast messages of adjacent nodes. Particularly the transceiver 1104 is configured to measure the adjacent nodes, and to obtain the network perceived information of the first node according to the measurement information; and/or to receive the broadcast messages sent by the adjacent nodes, and to obtain the network perceived information of the first node according to the received broadcast messages.

The processor 1101 can be configured to create an environmental information map of the first node according to the network perceived information obtained by the transceiver 1104, where the environmental information map of the first node represents one or any combination of the following information: relative positions between the first node and the adjacent nodes of the first node; a neighbor relation of the first node; and spectrum use conditions of the adjacent nodes of the first node. When the transceiver 1104 receives an indicator that an adjacent node of the first node accesses or exits, or detects a movement of adjacent node of the first node, the processor 1101 is configured to update the environmental information map of the first node.

The transceiver 1104 is configured to obtain characteristic information of the first node, and the adjacent nodes of the first node. Particularly the transceiver 1104 is configured to interact with the adjacent nodes of the first node over backhaul links between the first node and the adjacent nodes to obtain the characteristic information of the adjacent nodes of the first node.

There is a backhaul link between the first node and a central node, and the first node is not in a management domain of the central node; and if the adjacent nodes of the first node include a second node, where the second node is a node in the management domain of the central node, and there is no backhaul link between the first node and the second node, then the transceiver 1104 will be configured to interact with the central node over the backhaul link between the first node and the central node to obtain the characteristic information of the second node.

The first node is not in a management domain of a central node; and if the adjacent nodes of the first node include a second node, where the second node is in the management domain of the central domain, and there is a backhaul link between the first node and the second node, then:

The transceiver 1104 will be configured to interact with the second node over the backhaul link between the first node and the second node to request the characteristic information of the second node; and the second node retrieves the characteristic information of the second node from the central node over the backhaul link between the second node and the central node, and send it to the first node; and The transceiver 1104 will be configured to interact with the second node over the backhaul link between the first node and the second node to obtain the characteristic information of the second node.

The processor 1101 is configured to configure the first node with a service policy according to the environmental information map, and the characteristic information of the first node, and the adjacent nodes of the first node.

The memory 1103 is configured to store one or more executable programs for configuring the processor 1101.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming onto the scope of the disclosure.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for configuring a service policy through network perception, the method comprises:
    obtaining network perceived information of a first node, wherein the network perceived information of the first node comprises measurement information measured by the first node, information obtained by the first node from broadcast messages of adjacent nodes, or a combination thereof;
    creating an environmental information map of the first node according to the network perceived information, wherein the environmental information map of the first node represents: relative positions between the first node and adjacent nodes of the first node, a neighbor relation of the first node, spectrum use conditions of the adjacent nodes of the first node, or a combination thereof;
    obtaining characteristic information of the first node, wherein the characteristic information of the first node comprises information of the first node comprising: capability information, a supported frequency, a supported bandwidth, a type of a backhaul link, a characteristic of the backhaul link, or a combination thereof; and
    configuring the first node with a service policy according to the environmental information map, and the characteristic information of the first node, wherein configuring, by the network device, the first node with the service policy comprises: configuring the first node with an operating frequency, configuring the first node with an operating bandwidth, configuring the first node with a cell identifier, configuring the first node with a role in a network, configuring the first node with a coordinative or cooperative relationship between the first node and another node, or a combination thereof.

2. The method according to claim 1, wherein
    the measured measurement information comprises one or any combination of following information:
    a signal strength, a signal quality, an operating frequency, an operating bandwidth, a radio frequency capability, geographical positional coordinates, and a cell identifier; and
    the information obtained by the first node from the broadcast message of adjacent nodes comprises one or any combination of following information:
    transmission power, a radio frequency capability, geographical positional coordinates, a cell identifier, Time Division Duplex (TDD) configuration information, and Multimedia Broadcast Multicast Service Single Frequency Network (MBSFN) configuration information.

3. The method according to claim 1, wherein the method further comprises:
    obtaining characteristic information of adjacent nodes of the first node; and
    the configuring the first node with the service policy comprises:
    configuring the first node with the service policy according to the environmental information map, and the characteristic information of the first node, and the adjacent nodes of the first node.

4. The method according to claim 3, wherein all of obtaining the network perceived information of the first node, creating the environmental information map of the first node according to the network perceived information, obtaining the characteristic information of the first node, and the adjacent nodes of the first node, and configuring the first node with the service policy, are performed by a central node; and
    a management domain of the central node comprises the first node.

5. The method according to claim 4, wherein the obtaining the network perceived information of the first node comprises:
    receiving, by the central node, a measurement report message reported by the first node, wherein the measurement report message comprises a part or all of measurement information of the first node for the adjacent nodes; and/or
    receiving, by the central node, information reported by the first node, wherein reported information comprises information obtained by the first node from broadcast messages sent by the adjacent nodes.

6. The method according to claim 4, wherein the obtaining the characteristic information of the first node, and the adjacent nodes of the first node comprises:
    receiving, by the central node, the characteristic information reported respectively by the first node, and the adjacent nodes of the first node.

7. The method according to claim 4, wherein the obtaining the characteristic information of the adjacent nodes of the first node comprises:
    if the adjacent nodes of the first node comprise a second node, wherein the second node is not in the management domain of the central node, and there is a backhaul link between the second node and the central node, then interacting, by the central node, with the second node over the backhaul link between the central node and the second node to obtain the characteristic information of the second node.

8. The method according to claim 4, wherein the first node is in the management domain of the central node; and
    the obtaining the characteristic information of the adjacent nodes of the first node comprises:
    if the adjacent nodes of the first node comprise a second node, wherein the second node is not in the management domain of the central node, and there is a backhaul link between the first node and the second node, then:
    instructing, by the central node, the first node to report the characteristic information of the second node, so that the first node interacts with the second node over the backhaul link between the first node and the second node in response to the instruction to obtain the characteristic information of the second node, and sends the obtained characteristic information to the central node; or sending, by the first node, the characteristic information sent by the second node, to the central node.

9. The method according to claim 3, wherein all of obtaining the network perceived information of the first node, creating the environmental information map of the first node according to the network perceived information, obtaining the characteristic information of the first node, and the adjacent nodes of the first node, and configuring the first node with the service policy, are performed by the first node.

10. The method according to claim 9, wherein the obtaining the network perceived information of the first node comprises:
measuring, by the first node, the adjacent nodes, and obtaining the network perceived information of the first node according to measurement information; and/or
receiving, by the first node, broadcast messages sent by the adjacent nodes, and obtaining the network perceived information of the first node according to the received broadcast messages.

11. The method according to claim 9, wherein the obtaining the characteristic information of the adjacent nodes of the first node comprises:
interacting, by the first node, with the adjacent nodes of the first node over backhaul links between the first node and the adjacent nodes to obtain the characteristic information of the adjacent nodes of the first node.

12. The method according to claim 9, wherein there is a backhaul link between the first node and the central node, and the first node is not in a management domain of the central node; and
the obtaining the characteristic information of the adjacent nodes of the first node comprises:
if the adjacent nodes of the first node comprise a second node, wherein the second node is a node in the management domain of the central node, and there is no backhaul link between the first node and the second node, then interacting, by the first node, with the central node over the backhaul link between the first node and the central node to obtain the characteristic information of the second node.

13. The method according to claim 9, wherein the first node is not in a management domain of the central node; and
the obtaining the characteristic information of the adjacent nodes of the first node comprises:
if the adjacent nodes of the first node comprise a second node, wherein the second node is in the management domain of the central node, and there is a backhaul link between the first node and the second node, then:
interacting, by the first node, with the second node over the backhaul link between the first node and the second node to request for the characteristic information of the second node, wherein the second node retrieves the characteristic information of the second node from the central node over the backhaul between the second node and the central node, and sends the characteristic information of the second node to the first node; or
interacting, by the first node, with the second node over the backhaul between the first node and the second node to obtain the characteristic information of the second node.

14. The method according to claim 1,
wherein the creating the environmental information map of the first node according to the network perceived information comprises one of:
determining relative positions between the first node and adjacent nodes of the first node according to the network perceived information, and creating the environmental information map of the first node;
determining a neighbor relation of the first node according to the network perceived information, and creating the environmental information map of the first node;
determining spectrum use conditions of adjacent nodes of the first node according to the network perceived information, and creating the environmental information map of the first node;
determining relative positions between the first node and adjacent nodes of the first node according to the network perceived information, determining a neighbor relation of the first node according to the relative positions, and creating the environmental information map of the first node according to the relative positions, and the neighbor relation of the first node;
determining relative positions between the first node and the adjacent nodes of the first node, and spectrum use conditions of the adjacent nodes of the first node according to the network perceived information, and creating the environmental information map of the first node;
determining a neighbor relation of the first node according to the network perceived information, determining spectrum use conditions of adjacent nodes of the first node according to the neighbor relation of the first node, and creating the environmental information map of the first node according to the neighbor relation of the first node, and the spectrum use conditions of the adjacent nodes of the first node; and
determining relative positions between the first node and adjacent nodes of the first node according to the network perceived information, determining a neighbor relation of the first node according to the relative positions, determining spectrum use conditions of the adjacent nodes of the first node according to the neighbor relation of the first node, and creating the environmental information map of the first node according to the relative positions, the neighbor relation, and the spectrum use conditions;
wherein the method further comprises:
updating the environmental information map of the first node upon reception of an indicator that an adjacent node of the first node accesses or exits, or upon detecting a movement of an adjacent node of the first node.

15. A network device, comprising:
a processor configured to read programs in a memory, and to perform processes of:
obtaining network perceived information of a first node through a transceiver, wherein the network perceived information of the first node comprises measurement information measured by the first node, information obtained by the first node from broadcast messages of adjacent nodes, or a combination thereof,
creating an environmental information map of the first node according to the network perceived information obtained by the transceiver, wherein the environmental information map of the first node represents: relative positions between the first node and adjacent nodes of the first node, a neighbor relation of the first node, spectrum use conditions of the adjacent nodes of the first node, or a combination thereof;
obtaining characteristic information of the first node through the transceiver, wherein the characteristic information of the first node comprises information of the first node comprising: capability information, a supported frequency, a supported bandwidth, a type of a backhaul link, a characteristic of the backhaul link, or a combination thereof, and configuring the first node with a service policy according to the environmental information map, and the characteristic information of the first node, wherein configuring the first node with the service policy comprises: configuring the first node with an operating frequency, configuring the first node with an operating bandwidth, configuring the first node with a cell identifier, configuring the first node with a role in a network, configuring the first node with a coordinative or cooperative relationship between the first node and another node, or a combination thereof;

the memory configured to store one or more executable programs for configuring the processor; and the transceiver configured to be controlled by the processor to transmit and receive data.

16. The network device according to claim 15, wherein the processor is further configured to read the programs in the memory, and to perform a process of: obtaining characteristic information of adjacent nodes of the first node through the transceiver; and when configuring the first node with the service policy, the processor is configured to read the programs in the memory, and to perform the process of: configuring the first node with the service policy according to the environmental information map, and the characteristic information of the first node, and the adjacent nodes of the first node.

17. The network device according to claim 16, wherein the network device is a central node; and a management domain of the central node comprises the first node.

18. The network device according to claim 17, wherein the processor is configured to read the programs in the memory, and to perform processes of:

receiving a measurement report message reported by the first node through the transceiver, wherein the measurement report message comprises a part or all of measurement information of the first node for the adjacent nodes; and/or receiving information reported by the first node through the transceiver, wherein the reported information comprises information obtained by the first node from broadcast messages sent by the adjacent nodes.

19. The network device according to claim 17, wherein the processor is configured to read the programs in the memory, and to perform a process of:

receiving the characteristic information respectively reported by the first node, and the adjacent nodes of the first node.

20. The network device according to claim 17, wherein the processor is configured to read the programs in the memory, and to perform a process of:

if the adjacent nodes of the first node comprise a second node, wherein the second node is not in the management domain of the central node, and there is a backhaul link between the second node and the central node, then interacting with the second node over the backhaul link between the central node and the second node through the transceiver to obtain the characteristic information of the second node.

21. The network device according to claim 17, wherein the first node is in the management domain of the central node; and the processor is configured to read the programs in the memory, and to perform a process of:

if the adjacent nodes of the first node comprise a second node, wherein the second node is not in the management domain of the central node, and there is a backhaul link between the first node and the second node, then:

instructing the first node through the transceiver to report the characteristic information of the second node, so that the first node interacts with the second node over the backhaul link between the first node and the second node in response to the instruction to obtain the characteristic information of the second node, and sends the obtained characteristic information to the central node; or receiving the characteristic information of the second node sent by the second node through the transceiver.

22. The network device according to claim 16, wherein the network device is the first node.

23. The network device according to claim 22, wherein the processor is configured to read the programs in the memory, and to perform processes of:

measuring the adjacent nodes through the transceiver, and obtaining the network perceived information of the first node according to measurement information; and/or receiving, by the first node, broadcast messages sent by the adjacent nodes through the transceiver, and obtaining the network perceived information of the first node according to received broadcast messages.

24. The network device according to claim 22, wherein the processor is configured to read the programs in the memory, and to perform a process of:

interacting with the adjacent nodes of the first node over backhaul links between the first node and the adjacent nodes through the transceiver to obtain the characteristic information of the adjacent nodes of the first node.

25. The network device according to claim 22, wherein there is a backhaul link between the first node and the central node, and the first node is not in a management domain of the central node; and the processor is configured to read the programs in the memory, and to perform a process of:

if the adjacent nodes of the first node comprise a second node, wherein the second node is a node in the management domain of the central node, and there is no backhaul link between the first node and the second node, then interacting with the central node over the backhaul link between the first node and the central node through the transceiver to obtain the characteristic information of the second node.

26. The network device according to claim 22, wherein the first node is not in a management domain of the central node; and the processor is configured to read the programs in the memory, and to perform processes of:

if the adjacent nodes of the first node comprise a second node, wherein the second node is in the management domain of the central node, and there is a backhaul link between the first node and the second node, then:

interacting with the second node over the backhaul link between the first node and the second node through the transceiver to request for the characteristic information of the second node, and receiving the characteristic information of the second node, wherein the second node retrieves the characteristic information of the second node from the central node over the backhaul between the second node and the central node, and sends it to the first node; or interacting with the second node over the backhaul between the first node and the second node through the transceiver to obtain the characteristic information of the second node.

27. The network device according to claim 15, wherein the processor is further configured to read the programs in the memory, and to perform a process of:

when the transceiver receives an indicator that an adjacent node of the first node accesses or exits, or detects a movement of an adjacent node of the first node, updating the environmental information map of the first node.

* * * * *